United States Patent [19]

McBrayer

[11] Patent Number: 4,519,160
[45] Date of Patent: May 28, 1985

[54] MEANS FOR KILLING FLYING INSECTS AND FOR DISCHARGING AN ATTRACTANT THEREFROM

[76] Inventor: Carl L. McBrayer, 428 Grand St., Redwood City, Calif. 94062

[21] Appl. No.: 618,755

[22] Filed: Jun. 8, 1984

Related U.S. Application Data

[63] Continuation of Ser. No. 348,846, Feb. 16, 1982.

[51] Int. Cl.³ .......................... A01M 1/04; A01M 5/02
[52] U.S. Cl. ............................................ 43/113; 43/138
[58] Field of Search .................. 43/113, 122, 138, 142

[56] References Cited

U.S. PATENT DOCUMENTS

| | | | |
|---|---|---|---|
| 623,977 | 5/1899 | Brillhart | 43/142 |
| 2,778,150 | 1/1957 | Pohlman | 43/138 |
| 2,799,117 | 7/1957 | Stokes et al. | 43/113 |
| 2,883,790 | 4/1959 | Blockman | 43/113 |
| 3,807,083 | 4/1974 | Smith et al. | 43/138 |
| 4,251,945 | 2/1981 | Tasma | 43/113 |
| 4,438,585 | 3/1984 | Slatton | 43/113 |

Primary Examiner—Nicholas P. Godici
Assistant Examiner—M. Jordan
Attorney, Agent, or Firm—Flehr, Hohbach, Test, Albritton & Herbert

[57] ABSTRACT

Apparatus for killing flying insects serves to propagate an attractant therefrom. An elongate wire-like element mounted for rotation about a point intermediate the ends thereof defines an imaginary plane. A motor rotates the element at a speed sufficient to preclude the flying insects from passing across the plane. The element strikes and kills any such insects deflecting parts of them to smash against a wall surface surrounding and adjacent to the path defined by the tips of the element. The insect parts being smashed against the wall generate a sex attractant therefrom which is carried into the atmosphere by air currents generated by rotation of the element. The insect parts also provide a protein bait. A skirt depends downward from the entrance opening sufficiently so as to intercept parts of insects which ricochet from the sidewall toward the motor.

1 Claim, 4 Drawing Figures

U.S. Patent  May 28, 1985  4,519,160
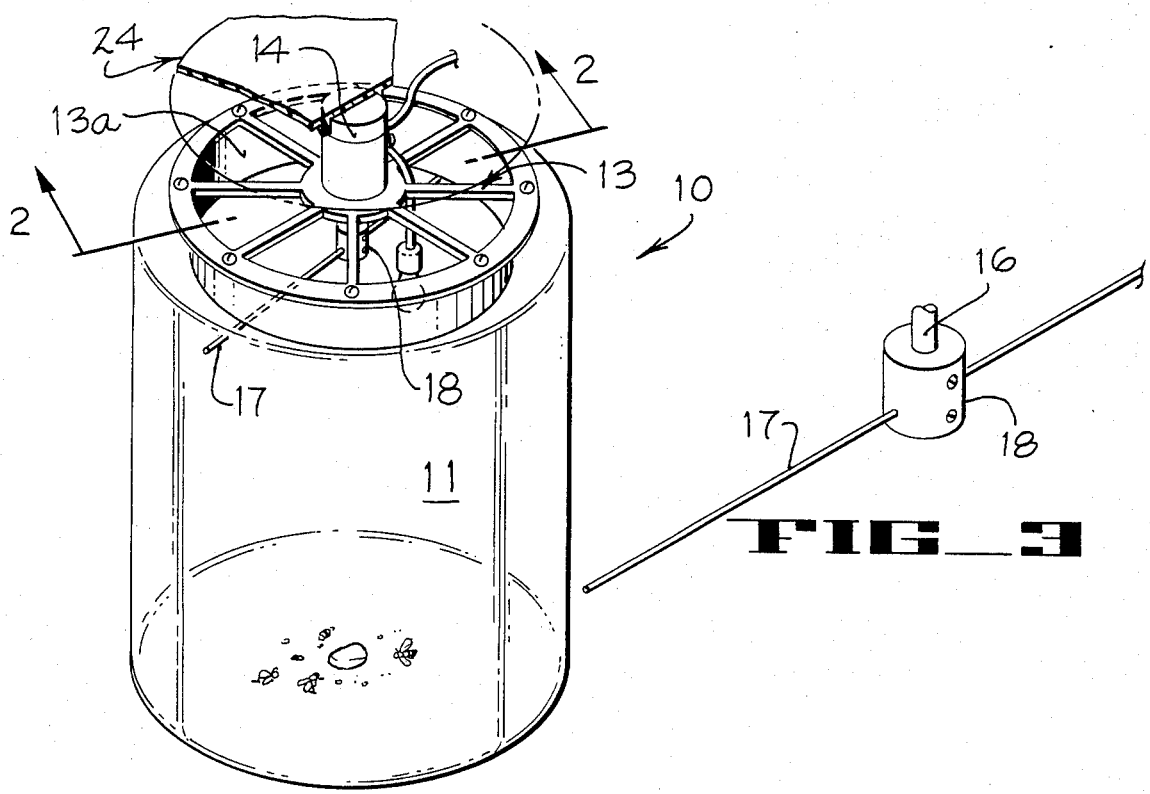
FIG_1
FIG_3
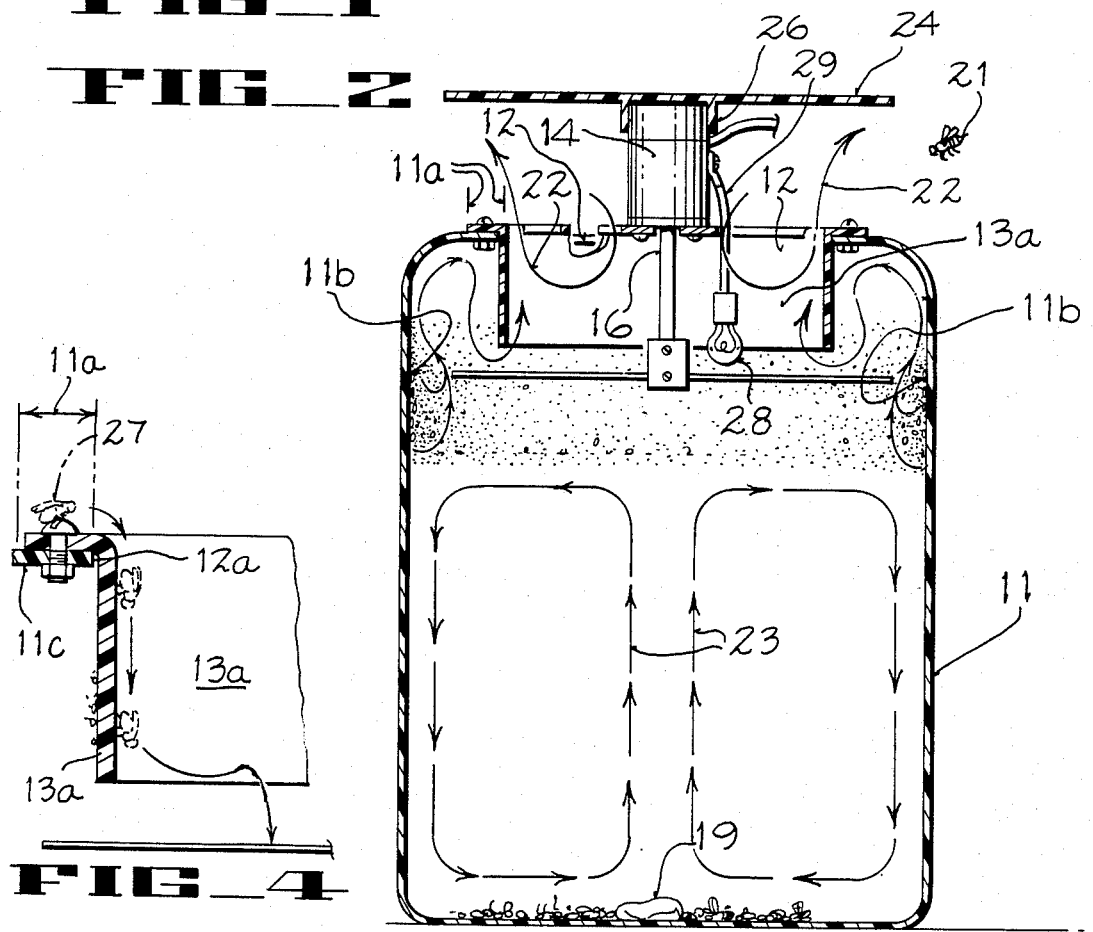
FIG_2
FIG_4

MEANS FOR KILLING FLYING INSECTS AND FOR DISCHARGING AN ATTRACTANT THEREFROM

This is a continuation of application Ser. No. 348,846 filed Feb. 16, 1982.

This invention pertains to a method and means for killing flying insects and more particularly to such a method and means wherein an attractant is propagated from the method of killing Heretofore, when it has been desired to kill flying insects, chemical sprays and the like have been required. However, where flying insects need to be killed around food in preparation or the like, the use of such chemical sprays can contaminate the food.

Accordingly, there has been a need for an improved method and means for killing flying insects in a non-contaminating manner.

Chemical attractants for causing flying insects to move toward a given source have been known. However, the use of such chemical attractants also includes the risk of contamination Accordingly, it is desirable to have a mechanical method and means for killing flying insects and for propagating an attractant of a non-chemical nature.

In general, as disclosed herein, a method and mechanical means for killing flying insects serves to propagate an attractant therefrom. An elongate wire-like element mounted for rotation about a point intermediate the ends thereof defines an imaginary plane. A motor rotates the element at a speed sufficient to preclude the flying insects from passing across the plane. The element strikes and kills any such insects deflecting parts of them to smash against a wall surface surrounding and adjacent to the path defined by the tips of the element. The insect parts being smashed against the wall generate a sex attractant therefrom which is carried into the atmosphere by air currents generated by rotation of the element. The insect parts also provide a protein bait.

It is a general object of the invention to provide an improved method and means for attracting and killing flying insects.

Another object of the invention is to provide a method and means for mechanically killing flying insects and propagating an attractant therefrom.

Yet another object of the invention is to provide apparatus for attracting and killing flying insects by rotating blade means serving to kill the insects and to provide a flow of air therefrom for carrying an attractant to the environs.

The foregoing and other objects of the invention shall become more readily evident from the following detailed description of a preferred embodiment when considered in conjunction with the drawings.

FIG. 1 shows a diagrammatic perspective view of a machine for mechanically killing flying insects according to the invention;

FIG. 2 shows an elevation center line section view of the structure shown in FIG. 1 according to the invention;

FIG. 3 shows a diagrammatic perspective view of a detail pertaining to the mounting of a rotatable wire-like element; and FIG. 4 shows an enlarged detail view, in section, of a portion of FIG. 2.

The machine 10 for mechanically killing flying insects such as flies, bees, wasps and the like and for propagating an attractant therefrom includes an enclosure 11 of clear material. Enclosure 11 preferably is formed from a transparent material, such as glass or plastic for reasons noted below. The top of enclosure 11 includes a relatively large opening 12. The edge margin 11a surrounding opening 12 supports a guard 13. Guard 13 includes a downwardly extending skirt 13a for purposes explained further below.

An electric motor 14 supported by guard 13 includes a spindle 16 disposed axially of enclosure 11.

Means for supporting an elongate wire-like element 17 for rotation includes the chuck or hub 18 mounted to spindle 16. Preferably, element 17 is made from a length of piano wire on the order of 0.025 inch diameter. Element 17 is of a length whereby the path defined by the tips thereof lies adjacent to an inner sidewall portion 11b of enclosure 11.

A cover 24 having a cup shaped central portion 26 snaps onto the upper end of motor 14 to prevent a person from inserting their fingers into the plane of movement of element 17. Cover 24 also prevents enclosure 11 from collecting rain water.

In operation, for example, where it is desired to attract and destroy flies, a piece 19 of chicken liver, hamburger or the like can be disposed within enclosure 11 to initially attract a fly or two. Motor 14 is operated at a speed sufficient to prevent flies from passing across the plane defined by the rotating element 17, preferably on the order of 3,000 rpm. The rotation of element 17 serves to draw air downwardly generally alongside motor 14 and to discharge the air upwardly at a radially outer position shown by the arrows 22. In addition air is circulated across the collection of dead flies lying on the bottom of enclosure 11, as shwon by the air currents 23.

It has been observed that the dead flies provide a protein attractant or bait as well as the sex attractant noted. Thus, air currents 23 assist in propagating additional attractant.

As a fly passes into the plane of rotation of element 17, element 17 kills the fly and deflects parts of it to the inner wall portion 11b where they are smashed upon impact. It has been discovered that by killing flies and other flying insects in this manner a sex attractant is generated adapted to become entrained in the flow of air out of enclosure 11.

The back or outer surface of skirt 13a extends sufficiently downwardly toward element 17 as to intercept parts of the flies which ricochet from wall portion 11b toward motor 14. It has been observed that if motor 14 becomes splattered with parts of the dead insects it provides a diversion to the entering flies.

In addition, the axial extent of skirt 13a must be sufficient to encourage the insect to fly into the enclosure rather than to walk into it. Thus, some flies land upon enclosure 11 as noted at 27 in FIG. 4. Without a proper skirt 13a, fly 27 can walk around the edge 12a and upside down along the undersurface 11c of enclosure 11 and eventually downwardly along the inner wall surface 11b. However, with the elongate skirt 13a it has been noted that the flies tend not to choose to walk, but fly. Then, on taking off they fly into element 17.

Further, the elongate skirt 13a tends to keep the walking flies from backing out.

In addition, a light 28 connected by leads 29 from motor 14 serves to attract night flying insects to be killed in the same manner and generate both a sex attractant and protein attractant therefrom.

Accordingly, machine 10 carries out the method of killing flying insects following the steps of rotating an elongate wire-like element to generally define an imaginary plane at a rate sufficient to prevent the insects from flying through the plane. The rotating element strikes the insects attempting to fly across the plane. The wire-like element kills and deflects the insects to be smashed against a surrounding sidewall. Thus, the insects are impacted against the sidewall in a manner serving to generate an attractant therefrom and the attractant is pumped into the atmosphere by rotation of element 17.

From the foregoing it will be readily evident that there has been provided an improved means for safely mechanically killing flying insects and for drawing the insects thereto.

It has been observed that the machine as described above has been capable of drawing insects, such as flies, from as far away as several miles. Accordingly, it will be readily evident that a machine of the kind described can be useful in removing a bothersome population of flying insects from a local area, such as a picnic ground or the like, while at the same time remaining entirely safe with respect to contaminating the area in which it operates. It has been further observed that flies as thus attracted pay little or no attention to open food even when located adjacent the enclosure 11.

I claim:

1. A machine for killing flying insects and propagating a sex attractant therefrom comprising container means forming an enclosure having an opening leading into said enclosure, motive means carried by said container means externally of said enclosure and disposed substantially axially of said opening, an elongate stiff wire-like element extending substantially fully across said opening and coupled to said motive means to be rotated within said enclosure substantially in a plane lying across said opening and at a rate sufficient to substantially preclude any such insect from flying across said plane, said element serving to deflect any such insect to cause it to strike the inner sidewall of said enclosure with sufficient impact to develop a sex attractant therefrom, said opening being surrounded by an edge margin, means forming a skirt depending downwardly from said edge margin of said opening, said skirt extending sufficiently downwardly so as to intercept parts of insects which ricochet from said sidewall toward said motive means to prevent the parts from reaching the motive means, said element further serving to pump said attractant into the atmosphere.

* * * * *